US012792427B2

(12) United States Patent
Gallagher et al.

(10) Patent No.: US 12,792,427 B2
(45) Date of Patent: Nov. 10, 2026

(54) AUTOMATICALLY INJECTING SHIMS INTO RUNNING CONTAINERS

(71) Applicant: Red Hat, Inc., Raleigh, NC (US)

(72) Inventors: Brian Gallagher, Waterford (IE); Cathal O'Connor, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 844 days.

(21) Appl. No.: 18/069,733

(22) Filed: Dec. 21, 2022

(65) Prior Publication Data

US 2024/0211323 A1 Jun. 27, 2024

(51) Int. Cl.
*G06F 9/54* (2006.01)
*G06F 8/65* (2018.01)
*G06F 21/62* (2013.01)

(52) U.S. Cl.
CPC ................ *G06F 9/541* (2013.01); *G06F 8/65* (2013.01); *G06F 21/629* (2013.01)

(58) Field of Classification Search
None
See application file for complete search history.

(56) References Cited

U.S. PATENT DOCUMENTS

| | | | | |
|---|---|---|---|---|
| 8,949,826 B2 | | 2/2015 | Fitzgerald et al. | |
| 10,417,065 B2 | | 9/2019 | Ambichl et al. | |
| 11,042,450 B2 | | 6/2021 | Kang et al. | |
| 2010/0260075 | A1* | 10/2010 | Smith | H04Q 3/0016 370/261 |
| 2016/0378545 | A1* | 12/2016 | Ho | G06F 11/302 718/107 |
| 2017/0180421 | A1* | 6/2017 | Shieh | H04L 63/10 |
| 2017/0269978 | A1* | 9/2017 | Engel | G06F 9/541 |
| 2017/0351695 | A1* | 12/2017 | Rao | G06F 16/188 |
| 2018/0332012 | A1* | 11/2018 | Koster | H04L 9/0891 |
| 2019/0303623 | A1* | 10/2019 | Reddy | G06F 11/3692 |
| 2019/0335004 | A1* | 10/2019 | Yang | G06F 8/316 |
| 2020/0366573 | A1* | 11/2020 | White | G06F 9/45558 |
| 2021/0103477 | A1* | 4/2021 | Mcclymont | G06F 21/629 |
| 2022/0103593 | A1 | 3/2022 | Singh et al. | |
| 2022/0300330 | A1 | 9/2022 | White et al. | |
| 2023/0028635 | A1* | 1/2023 | Dunnell | G06F 9/541 |
| 2023/0065431 | A1* | 3/2023 | Kumar | G06F 9/445 |
| 2023/0071714 | A1* | 3/2023 | Huo | G06F 9/45558 |
| 2023/0118939 | A1* | 4/2023 | Malvankar | G06F 9/45558 718/1 |

FOREIGN PATENT DOCUMENTS

| | | |
|---|---|---|
| CN | 112817693 A | 5/2021 |
| CN | 112882793 A | 6/2021 |
| CN | 113986468 A | 1/2022 |

OTHER PUBLICATIONS

U.S. Appl. No. 17/743,650, filed May 13, 2022.

* cited by examiner

*Primary Examiner* — April Y Blair
*Assistant Examiner* — Kenneth P Tran
(74) *Attorney, Agent, or Firm* — Kilpatrick Townsend & Stockton LLP

(57) ABSTRACT

One example can include a system that can determine that a subset of containers in a distributed computing environment have characteristics that match a predefined set of shim injection criteria. The system can then inject respective copies of a shim into the subset of containers, while the subset of containers are running in the distributed computing environment. Each respective copy of the shim may be configured to intercept calls between software programs in a corresponding container.

20 Claims, 4 Drawing Sheets

AUTOMATICALLY INJECTING SHIMS INTO RUNNING CONTAINERS

TECHNICAL FIELD

The present disclosure relates generally to containers deployed in computing environments. More specifically, but not by any way of limitation, this disclosure relates to automatically injecting shims into containers based on certain criteria.

BACKGROUND

A shim may intercept communications (e.g., calls or messages) between software programs and perform one or more actions based on the intercepted communications. For example, the shim may allow certain calls, block certain calls, change arguments passed by the calls, handle calls itself, or redirect calls elsewhere. Shims may be useful for a variety of reasons, such as for overcoming compatibility constraints, resolving bugs, or mitigating software vulnerabilities. For example, a login manager may be installed on a particular operating system. But, after an update, the login manager may be unable to access a required software component because the updated login manager may transmit calls to the wrong location. A shim may be used to provide access to the missing software component by intercepting and forwarding the calls from the login manager to the correct location hosting the software component.

DETAILED DESCRIPTION

Figure 1:
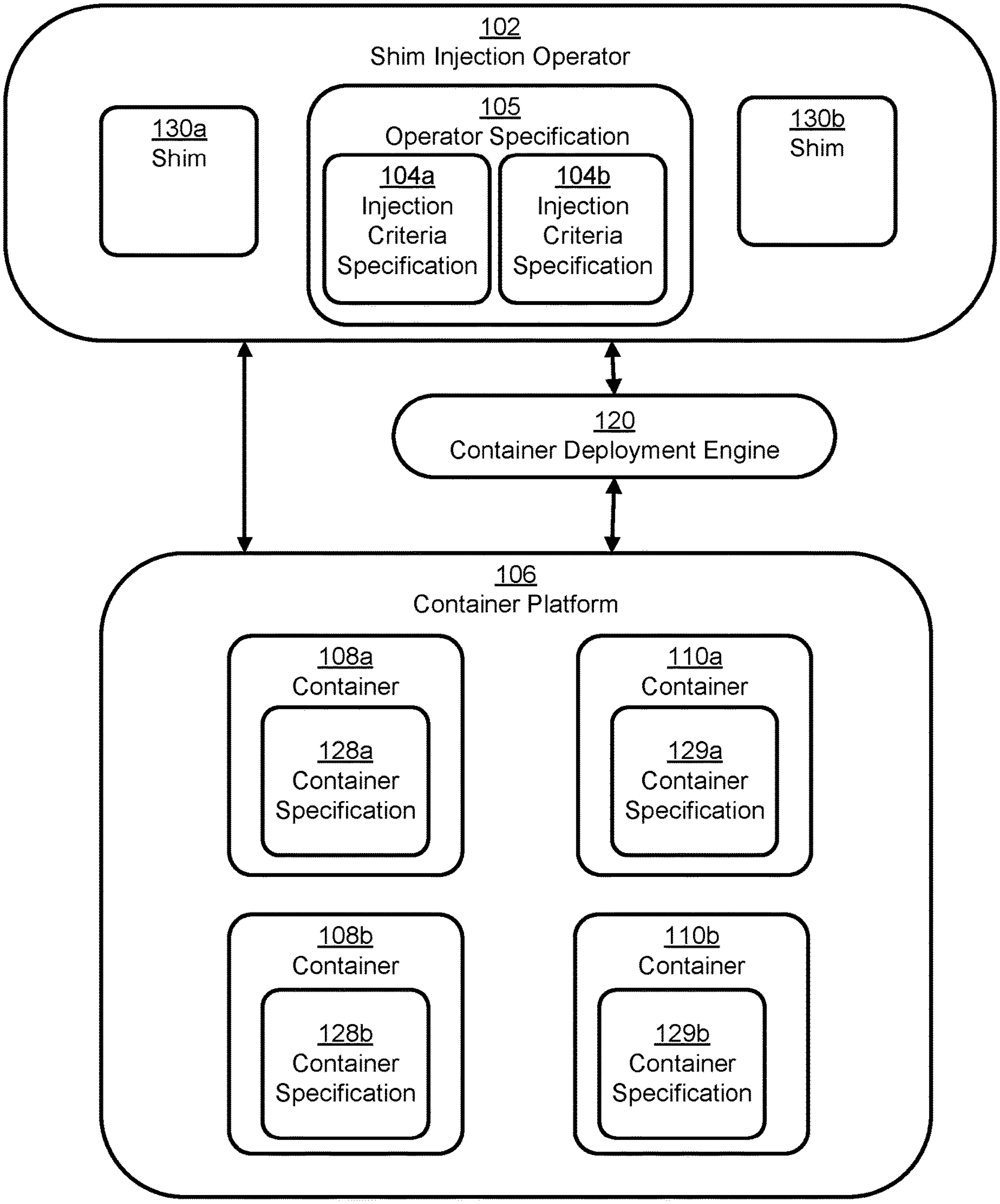
FIG. 1 is a block diagram of an example of a system for automatically injecting shims into running containers according to some aspects of the present disclosure.

A container image may be designed to deploy a target software program in a computing environment. To help support the target software program, the container image may include dozens of libraries, binaries, and other files on which the target software may depend at runtime. But some of those dependencies may have vulnerabilities that can be exploited by malicious entities (e.g., computer hackers). Alternatively, some of those dependencies may be outdated. In some examples, dependencies within a container image may need to be altered to function in a new API environment. In some examples, dependencies within a container image may need to be altered to maintain compatibility with software programs. Updating the container image with safe, updated versions of these dependencies normally requires the containers themselves be restarted. Restarting containers or restarting applications on containers can contribute to downtime. In some instances, the source code needed to write updated versions of these dependencies may not be available. For example, a library may have been produced by a company that no longer exits. Regardless of the obstacles present in updating software dependencies, solutions may need to be deployed rapidly, for example before vulnerabilities can be exploited, and with minimal downtime.

Some examples of the present disclosure can overcome one or more of the abovementioned problems by providing a control system that can automatically inject a shim into a running container that matches predefined shim-injection criteria, where the shim can intercept and potentially redirect communications between software programs. As one specific example in the context of Kubernetes, an operator can be used to automatically inject shims into running containers that match predefined shim-injection criteria. Kubernetes is a container management platform that can automate deployment, scaling, and management of containerized applications. An operator is a type of controller that can assist with packaging, deploying, and managing software applications and resources in Kubernetes. The operator could be used to automatically inject software shims to running containers that match the shim-injection criteria for any number of reasons, such as for rerouting API calls from a vulnerable container image software dependency, such as a library. Alternative examples may include rerouting API calls to maintain compatibility between software programs or to allow a container to run in a different API environment. The operator can determine which containers match the shim-injection criteria by analyzing the containers' characteristics, some of which may be listed in the specification of a container. In the context of Kubernetes, a container's specifications can include the container's settings and other information about the container. Such characteristics may include an operating system version of the container, libraries present on the container, or labels applied to the container. The operator may continuously scan for containers which possess the characteristics which qualify a container for shim injection. Upon identifying a container that qualifies for shim injection, the operator can initiate the process to automatically inject the shim into the running container. Once injected into the container, the shim can reroute calls between software programs and perform other operations to alter the functionality of the running container in ways that that normally may not be possible without shutting down the container, rebuilding it, and redeploying it. The operator can repeat this process for any number of containers to provide a holistic and automated management system for shim injection. Such an automatic management system can allow these types of functional alterations to be made at large scale across a large number of containers very rapidly, for example to keep running containers consistent with one another and to avoid other problems like vulnerabilities or compatibility issues.

As alluded to above, one reason that shim injection may be useful is to avoid or mitigate vulnerabilities or compatibility issues. For example, a library used by a container image may be identified as an attack vector. Rather than shutting down the application or the container, a shim may be injected to reroute API calls designated for the vulnerable or outdated library to another resource that may not have the vulnerability or otherwise be more current. An operator may scan the specifications of the containers and inject a shim into a container based on the vulnerable or outdated library being listed within the container specification.

In some examples, the operator may scan containers and inject shims within its own orchestration platform (e.g., its own Kubernetes deployment) or another container orchestration platform that is outside its own container orchestration platform. In some examples, the operator may scan containers and inject shims across multiple container orchestration platforms.

In some examples, the operator may track its shim-injection progress. For example, the operator can update its own operator specification as a means of tracking the progress of shim injections. Normally the operator specification may include settings and other information used to deploy and configure the operator, but in some examples the operator can update the operator specification to also include this tracking information. The tracking information may indicate containers where injections have been successful, containers where injections have failed, why injections have failed, and containers where injections are in progress. The shim injection operator may receive this injection status data from a container orchestration platform.

The operator may be able to automatically inject shims into containers while the containers and their respective software programs are running. For example, the operator can coordinate with a container deployment engine (e.g., Docker®) to inject a shim into a running container without having to shut the container down. In some examples, the operator can continually scan the distributed computing environment for containers which meet criteria for injection, for example to inject shims into existing containers based on new criteria or to inject shims into new containers that are deployed in the orchestration platform. This may help ensure that containers (e.g., vulnerable containers, outdated containers, or containers designed for a different API environment) that are deployed at different times within the distributed computing environment are updated with shims accordingly.

Using an operator to automatically inject shims into containers may prove useful in instances when a security vulnerability requires a faster response than releasing a new version may allow or in instances when a vendor may no longer support a version of a container or software program. Example criteria the operator may scan for can include scanning for a particular image, an operating system version, a container name, or a library named within the specification of the containers.

It will be appreciated that while various examples are described herein with respect to a Kubernetes operator, this is intended to be illustrative and non-limiting. Other examples may involve other types of controllers that can implement the same or similar functionality as the operator described herein.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system for automatically injecting shims 130*a*, 130*b* into running containers 108*a*, 108*b*, 110*a*, 110*b* according to some aspects of the present disclosure. The injection operator 102 may inject the shims 130*a*, 130*b* based on injection criteria specifications 104*a*, 104*b* within the operator specification 105 of the shim injection operator 102. The injection criteria specifications 104*a-b* can list shim-injection criteria, which can be criteria against which a container is evaluated to determine whether to inject a shim into the container. The shim-injection criteria can include container characteristics or other criteria. If the shim-injection criteria matches the characteristics of the containers 108*a*, 108*b*, 110*a*, 110*b*, the shim injection operator 102 can facilitate a process to inject shims into those containers. The shim injection operator 102 can determine whether the containers 108*a-b*, 110*a-b* match the shim-injection criteria in any suitable manner, for example by analyzing their corresponding container specifications 128*a*, 128*b*, 129*a*, 129*b*. The shim injection operator 102 may record data related to shim-injection activity in its own operator specification 105 to keep track of shim-injection progress and avoid duplicate attempts at injecting shims into the same container.

The shim 130*a* may be designed to perform any number of operations, such as to reroute API calls from a vulnerable library used by containers 108*a* and 108*b*. The shim 130*b* may also be designed to perform any number of operations that may be the same as or different from the operations performed by shim 130*a*. For example, the shim 130*b* may be a different type of shim than shim 130*a*.

The injection criteria specification 104*a* may list characteristics of containers for which a shim should be injected. If those listed characteristics correspond to characteristics of one or more containers, such as the containers 108*a* and 108*b*, the shim injection operator 102 can automatically initiate shim injection for those containers. In some examples, the shim injection operator 102 can determine the characteristics of a container, such as container 108*a*, by reading them from the corresponding container specification, such as container specification 128*a*. The injection criteria specification 104*b* may list different shim-injection criteria than injection criteria specification 104*a*. The shim injection operator 102 may be able to perform a similar process with respect to the containers 108*a-b*, 110*a-b* based on the shim-injection criteria in the injection criteria specification 104*b*. Any number of injection criteria specifications, with the same or different shim-injection criteria, may be used to automatically deploy the same type of shim or different types of shims into one or more containers.

As one specific example, containers 108*a* and 108*b* may have a version of the OpenSSL library that has been identified as vulnerable to attack. The characteristics within injection criteria specification 104*a* may list the OpenSSL library that is vulnerable to attack as well as a safe library to which to rerouting API calls. The shim injection operator 102 may deploy the shim 130*a* to the containers 108*a*, 108*b* based on the characteristics in the container specification 128*a*, 128*b* matching the criteria in the injection criteria specification 104*a*. The shim 130*a* may cause the containers 108*a*, 108*b* to reroute API calls bound for the vulnerable OpenSSL library given in the injection criteria specification 104*a* to the address of a safe library given in the injection criteria specification 104*a*. In some examples, the shim injection operator 102 may require approval from the container platform 106 to inject shims but may not necessarily require approval from the containers 108*a*, 108*b* themselves.

In some examples, the injection operator 102 may automatically inject the shims 130*a*, 130*b* into the containers 108*a*, 108*b*, 110*a*, 110*b* by interacting with a container deployment engine 120, such as Docker®. Injecting a shim into a container may involve deploying and executing the shim software inside the container. The container deployment engine 120 can facilitate the deployment of the shim software inside the container, for example by downloading the shim software to the container and instantiating it within the container. The container deployment engine 120 may have heightened permissions relative to the injection operator 102, which can allow the container deployment engine 120 to inject the shim into a running container. In some examples, the shim injection operator 102 may require permission from the container deployment engine 120 to inject the shim 130*a*. The shim injection operator 102 may not require permission from the container 108*a* itself to inject the shim 130*a*. The container deployment engine 120 may have an API, with which the shim injection operator 102 can interact to control injection of the shim. The container deployment engine 120 may download the shim 130*a* and deploy the shim 130*a* in a container 108*a*, for example into a shim layer where it can reroute API calls from software program to software program within the container 108*a*.

After the shim 130*a* is injected into a container, the shim 130*a* can serve as an intermediary that can transparently intercept calls and take corresponding action. For instance, in the OpenSSL example described above, the shim 130*a* may be injected into the running container 108*a* rather than downloading the safe OpenSSL library to the container. The shim 130*a* may then intercept and reroute API calls to the safe OpenSSL library, as opposed to downloading the library itself into the container. The calls may be rerouted with port-forward commands, which may tunnel traffic from a specified port on a machine running the container 108*a* to a port of another specified machine running the safe Open SSL library. By injecting the shim 103*a* into the container 108*a*, the shim injection operator 102 may be able to avoid certain security restrictions on the container 108*a*. Injecting the shim 103*a* rather than downloading the safe OpenSSL library to the container 108*a* may also reduce memory and bandwidth consumption associated with the container 108*a*. Rerouting calls to the safe OpenSSL library, rather than downloading the safe OpenSSL library to the container 108*a*, may also allow the container 108*a* to access the library while the container 108*a* and its software programs continue to run, without having to shutdown or rebuild the container 108*a* with new software. A similar approach can be applied to other types of libraries and software programs.

In some examples, the container platform 106 may be modified to overcome security restraints to facilitate shim injections into containers 108*a*, 108*b*, 110*a*, 110*b*. But the containers 108*a*, 108*b* receiving the shim 103*a* may not require any adjustment to receive the shim 130*a*. The container platform 106 may be altered to require the injection criteria specification 104*a* to match a signature, specific key, or password to be allowed injection. The container platform 106 could allow or reject shim injections 103*a*, 103*b* on the basis of preset security levels.

The injection criteria specification 104*a* may specify any suitable criteria for shim injection, such as operating system versions, running applications or libraries, resources consumption, settings, or any combination of these. The shim injection operator 102 may inject the shim 103*a* into a container 108*a* based on the container 108*a* meeting some or all of these criteria. The injection criteria specification 104*a* may also identify the shim that is to be injected. For example, the injection criteria specification 104*a* may indicate name, type, or address (e.g., a uniform resource locator address) associated with the shim that can be used to identify or obtain the shim. The shim injection operator 102 can determine which shim to inject based on this identifying information in the injection criteria specification 104*a*. The containers 108*a*, 108*b* may not require any alteration to receive the shim from the shim injection operator 102. The shim injection operator 102 can provide or specify the selected shim to the container deployment engine 120, which can then facilitate installation of the shim on a matching container.

The shim injection operator 102 may also inject shims into containers 110*a*, 110*b* based on other criteria within the injection criteria specification 104*b* that is distinct from the criteria within the injection criteria specification 104*a*. The shim injection operator 102 may scan the specifications of all containers within the container platform 106 that may have criteria which matches any of the injection criteria within the injection criteria specifications 104*a*, 104*b*. In some examples, the shim injection operator 102 may scan the container platform 106 for crashed containers that can be recovered by the shims 130*a*, 130*b*. The shim injection operator 102 may continuously monitor the container platform 106 for new containers that may meet the criteria of any shim 130*a*, 130*b* and may inject the appropriate shim accordingly. Alternatively, containers could be modified to communicate their characteristics to the shim injection operator 102, for example at periodic intervals, so that the shim injection operator 102 can evaluate whether a shim should be deployed in the containers.

The shim injection operator 102 may not need to be within the container platform 106 to monitor the container platform 106 for containers that match injection criteria. In some examples, the shim injection operator 102 may monitor multiple container platforms for containers that match various injection criteria corresponding to multiple injection criteria specifications. The criteria may include tags related to container metadata, wherein the metadata may indicate data such as services run by the containers, nodes or virtual machines on which the containers are running, or availability zones in which the containers are running.

The criteria within the injection criteria specifications 104*a*, 104*b* may include an operating system that is the focus of the injection criteria specifications 104*a*, 104*b*, a runtime for the shim 130*a*, 130*b*, or labels for containers. The injection criteria specification 104*a*, 104*b* may include a command to be executed when the shim is injected into the container, such as a fixup script to apply replacements to specified model files under a given folder. The command line may execute a particular process that may be necessary before the shim can be injected. The operator specification 105 of the shim injection operator 102 may also include a description of the shims 130*a*, 130*b*, and recorded statuses of which containers have been injected, which containers have failed to receive the shim injection, and which containers are in the processes of receiving the injection. The statuses recorded by the shim injection operator 102 to the injection criteria specification be determined based on input from the container platform 106.

Figure 2:
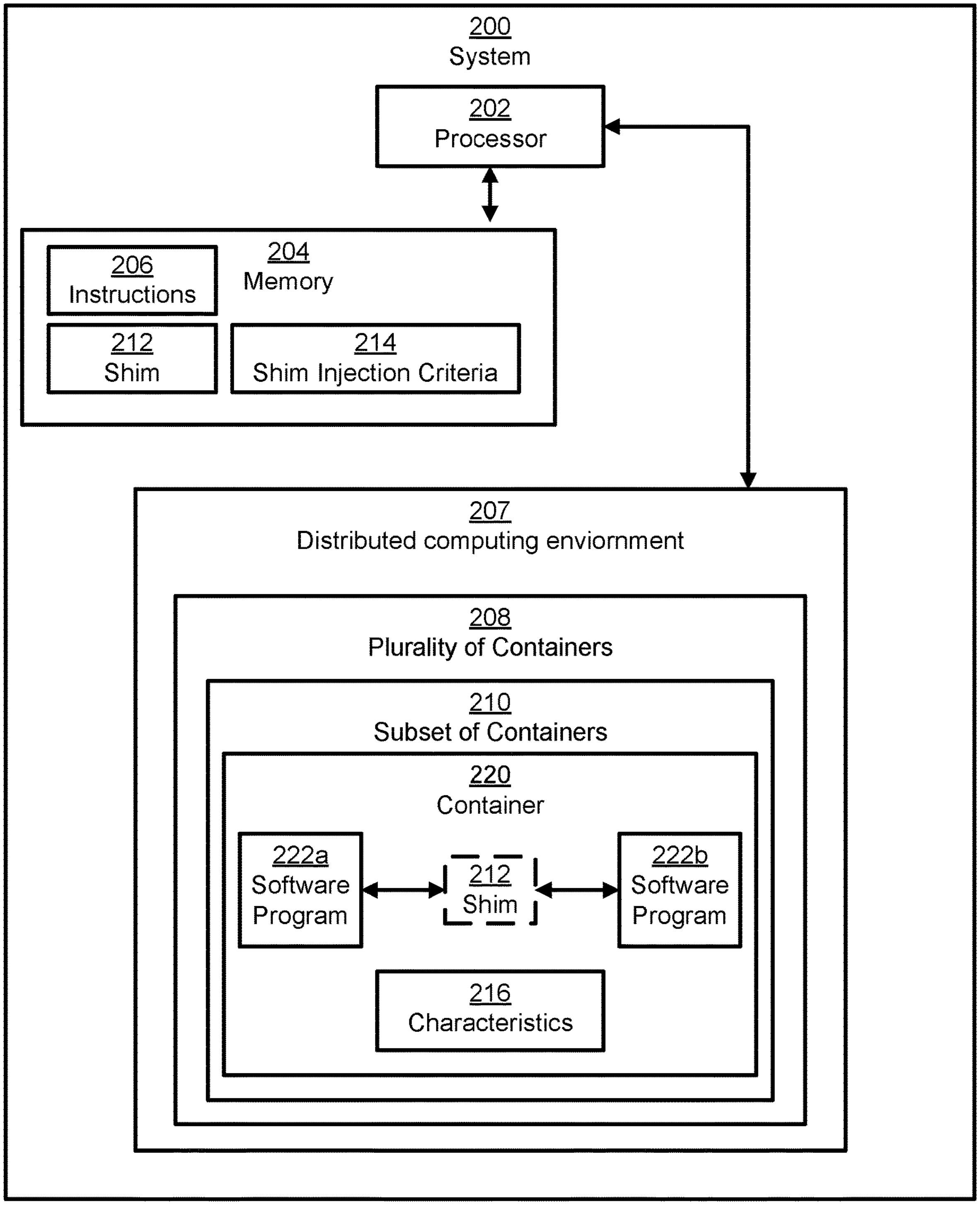
FIG. 2 is a block diagram of a system with instructions for automatically injecting shims into running containers according to some aspects of the present disclosure.

FIG. 2 is a block diagram of a system 200 with instructions for automatically injecting shims into running containers according to some aspects of the present disclosure. The system 200 includes a processor 202 communicatively coupled to a memory 204. In some examples, the processor 202 and the memory 204 may be parts of the same computing device. In other examples, the processor 202 and the memory 204 can be distributed (e.g., in separate housings) and remote from one another.

The processor 202 can include one processing device or multiple processing devices. Examples of the processor 202 can include a Field-Programmable Gate Array (FPGA), an application-specific integrated circuit (ASIC), or a microprocessor. The processor 202 can execute instructions 206 stored in the memory 204 to perform operations. The instructions 206 may include processor-specific instructions generated by a computer or an interpreter from code written in any suitable computer-programming language, such as C, C++, C #, and Java.

The memory 204 can include one memory device or multiple memory devices. The memory 204 can be volatile or non-volatile in that the memory 204 can retain stored information when powered off. Examples of the memory 204 include electrically erasable and programmable read-only memory (EEPROM), flash memory, or any other type of non-volatile memory. At least some of the memory 204 can include a non-transitory computer-readable medium from which the processor 202 can read instructions 206. A computer-readable medium can include electronic, optical, magnetic, other storage devices capable of providing the processor 202 with computer-readable instructions or other program code. Examples of a computer-readable medium include magnetic disks, memory chips, ROM, random-access memory (RAM), an ASIC, a configured processor, optical storage, or any other medium from which a computer processor can read the instructions 206.

The system can also include a distributed computing environment 207 with a plurality of containers 208, wherein the plurality of containers 208 contains a subset of containers 210 that are distinguished from the rest of the plurality of containers 208 by characteristics 216 that match the shim injection criteria 214. The memory 204 also includes a shim 212 for intercepting an API Call between software programs 222*a*, 222*b* in a corresponding container 220 within the subset of containers 210. The instructions 206 may cause the processor 202 to determine that the subset of containers 210, among the plurality of containers 208 executing in the distributed computing environment 207 have characteristics 216 that match the predefined set of shim injection criteria 214. The predefined set of shim injection criteria 214 may include characteristics 216 such as an operating system version of the subset of containers 210, applications running on the subset of containers 210, resources consumed by the subset of containers 210, the content of the subset container's 210 specification, and settings of the subset of containers 210.

In response to determining that the subset of containers 210 have characteristics 216 that match the predefined set of shim injection criteria 214, the instructions 206 may cause the processor to initiate shim-injection operations involving injecting respective copies of the shim 212 into the subset of containers 210 while the subset of containers 210 are running in the distributed computing environment 207. In such an example, each respective copy of the shim 212 may be configured to intercept API calls between software programs 222*a*, 222*b* in a corresponding container 220.

In some examples, the shim 212 may reroute API calls or other communications from a software program 222*a* that is running in a container 220 to a service that is external to the container 220, such as a service that is running in a remote cloud environment. For example, the shim 212 can intercept a call from a software program 222*a* running in the container 220 and forward it to a software program running in another container, which may be internal or external to the distributed computing environment 207. This can allow for a greater level of customizability and control over intercepted communications.

Figure 3:
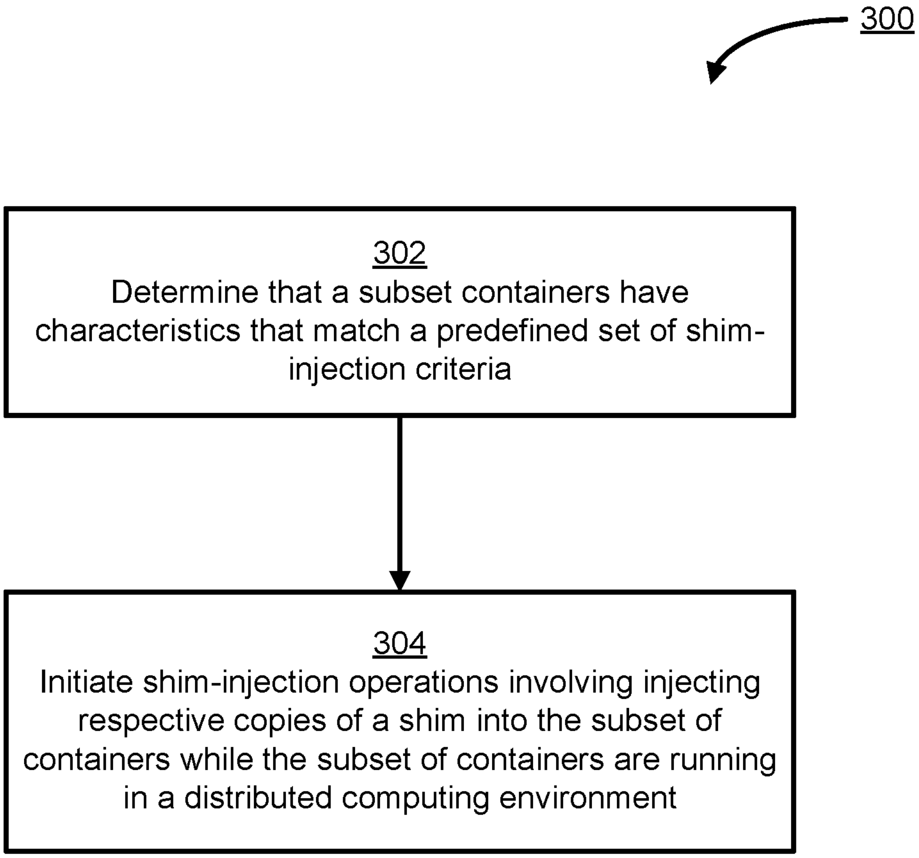
FIG. 3 is a flow chart of an example of a process for automatically injecting shims into running containers according to some aspects of the present disclosure.

FIG. 3 is a flow chart of an example of a process 300 for automatically injecting shims into running containers according to some aspects of the present disclosure. Other examples may include more operations, fewer operations, different operations, or a different order of operations than is shown in FIG. 3. The operations of FIG. 3 are described below with reference to the components of FIG. 2 above. In general, the process shown in FIG. 3 relates to injecting a shim 212 into a subset of containers 210 within a plurality of containers 208 based on shim injection criteria 214.

In block 302, the processor 202 may determine that the subset of containers 210, among the plurality of containers 208 executing in a distributed computing environment 207, have characteristics 216 that match a predefined set of shim injection criteria 214. The processor 202 may extract the predefined set of shim injection criteria 214 from a specification, such as a specification for a controller like an operator, in the distributed computing environment. To determine the subset of containers 210 which match the predefine set of shim injection criteria 214, the processor 202 may analyze the characteristics of the plurality of containers 208 to determine which ones match the shim injection criteria 214.

In block 304, the processor 202 may, in response to determining that the subset of containers 210 that match the predefined set of shim injection criteria 214, initiate shim-injection operations. The operations may involve injecting respective copies of the shim 212 into the subset of containers 210 while the subset of containers 210 are running in the distributed computing environment 207. In such an example, each respective copy of the shim 212 is configured to intercept calls between software programs 222*a*, 222*b* in a corresponding container 220.

In some examples, initiating the shim-injection operations may involve the processor 202 interacting with one or more container deployment engines of the distributed computing environment 207, the one or more container deployment engines being configured to inject the respective copies of the shim 212 into the subset of containers 210. The container deployment engines may access at a level of computing abstraction between software programs 222*a*, 222*b* running on a container 220 and a traffic layer in which the container 220 receives API calls. The container deployment engine may insert the respective copies of the shim 212 into the subset of containers 210 transparently to software programs running in the subset of containers 210. Upon injecting the copies of the shim 212 into the subset of containers 210, the processor 202 may update the specification the operator injecting the shim 212 to indicate a status associated with the subset of containers 210. The status may include how many containers within the subset of containers 210 have successfully received the shim 212, how many containers have failed to receive the shim 212, and how many containers are presently in a process of receiving the shim 212.

In some examples, the processor 202 may automatically detect deployment of a new container that matches the predefined set of shim injection criteria 214 and may also automatically initiate a shim-injection operation for injecting a copy of the shim 212 into the new container. For example, processor 202 may analyze the specification of the new container to determine whether it matches the shim injection criteria 214.

In one example, a vulnerability may be detected with a logging utility. The logging utility may keep a log of events that occur on a container, such as problems, errors, or information on current operations related to the operating system or other software programs running on the container. The vulnerability may allow a remote user access to an entire network through a cluster running the logging utility with the vulnerability. A shim injection operator may allow rapid distribution of a shim 212 as an API message rerouting solution to the vulnerability. Because injection of the shim 212 can occur without interrupting container operations or requiring downtime, injection of the shim 212 may be deployed quickly enough that the vulnerability solution can be deployed before the vulnerability can be exploited or, at least, before the vulnerability is further exploited. Also, the shim 212 may be deployed without requiring source code from software programs connected to the logging utility. In an example where the vulnerability must be overcome without the shim 212, the source code of software programs using the login utility may need to be obtained, understood, and made compatible with a solution. In such an example, various hurdles may be present that may stem from a company's willingness to release the source code of a software program or the speed at which the solution to the vulnerability can be effectively made compatible with the source code. However, by rerouting API calls with the shim 212, these hurdles can be avoided.

Figure 4:
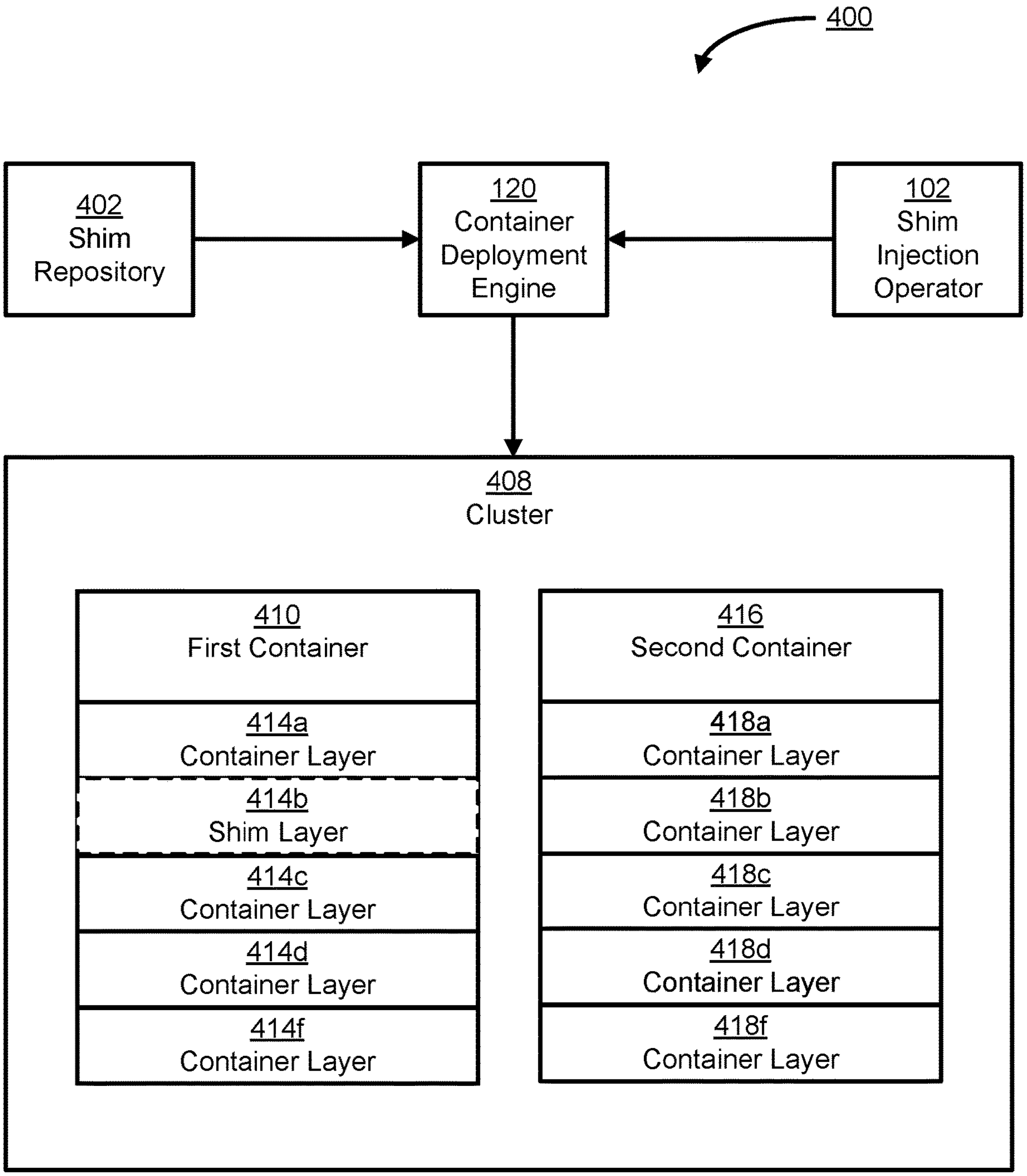
FIG. 4 is a block diagram of an example of a system for injecting shims into running containers according to some aspects of the present disclosure

FIG. 4 is a block diagram of a system 400 for injecting shims into running containers according to some aspects of the present disclosure. The system includes a shim repository 402 that may contain various software shims. The system 400 may include a container deployment engine 120 and a shim injection operator 102. The container deployment engine 120 may control a cluster 408 of containers, which may include a first container 410 and a second container 416. The cluster 408 of containers may be deployed on a container platform, such as the container platform 106 of FIG. 1.

The container deployment engine 120 may have an API that can allow the shim injection operator 102 to inject a shim from the shim repository 402 to a selected layer of the containers 410, 416 within the cluster 408. For example, the shim injection operator 102 can transmit a command to the API for causing the container deployment engine 120 to inject a particular shim in to container 410. In response to receiving the command, the container deployment engine 120 can retrieve the particular shim from the shim repository 402 and then inject the shim into a layer of the container 410, where the layer may be specified by the shim injection operator 102 (e.g., in the command). For example, the shim injection operator 102 may specify that a shim layer 414*b* is to be injected between container layer 414*a* and container layer 414*c* of the first container 410.

The shim injection operator 102 may reconcile the running containers 410, 416 and the container deployment engine 120 to ensure that the running containers 410, 416 have the required shim layer. If a new container is created within the cluster 408 for any reason, such as scaling for requirement, the shim injection operator 102 may detect the new container and automatically correspond with the container deployment engine 120 (e.g., using the API) to add the appropriate shim from the shim repository 402 to the appropriate layer within the new container.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples.

The invention claimed is:

1. A non-transitory computer-readable medium comprising program code that is executable by a processor for causing the processor to perform operations comprising:

analyzing each individual container of a plurality of containers executing in a distributed computing environment to determine whether the individual container has characteristics that match a predefined set of shim-injection criteria;

based on the analyzing, determining that a subset of containers, among the plurality of containers executing in the distributed computing environment, each individually have the characteristics that match the predefined set of shim-injection criteria; and in response to determining that the subset of containers each individually have the characteristics that match the predefined set of shim-injection criteria, initiating shim-injection operations that involve injecting a respective shim into a selected layer of each respective container of the subset of containers while the respective container is running in the distributed computing environment, such that the respective shim is executing inside an isolated environment of the respective container, wherein each respective shim is configured to intercept calls between a respective set of software programs located inside different layers of the respective container into which the respective shim is injected.

2. The non-transitory computer-readable medium of claim 1, wherein controller software is configured to execute the operations, and further comprising program code that is executable by the processor for causing the processor to:

determine the predefined set of shim-injection criteria by extracting the predefined set of shim-injection criteria from a specification used to deploy the controller software in the distributed computing environment.

3. The non-transitory computer-readable medium of claim 2, further comprising program code that is executable by the processor for causing the processor to update the specification to indicate a status of the shim-injection operations associated with the subset of containers, wherein the status includes how many containers within the subset of containers have successfully received the shim, how many containers have failed to receive the shim, and how many containers are presently in a process of receiving the shim.

4. The non-transitory computer-readable medium of claim 1, further comprising program code that is executable by the processor for causing the processor to:

determine respective characteristics of each respective container in the subset of containers by extracting the respective characteristics of each respective container in the subset of containers from a respective specification used to deploy the respective container in the distributed computing environment.

5. The non-transitory computer-readable medium of claim 1, further comprising program code that is executable by the processor for causing the processor to:

for each respective container of the subset of containers, insert the respective shim into the respective container of the subset of containers transparently to the respective set of software programs running inside the respective container.

6. The non-transitory computer-readable medium of claim 1, wherein initiating the shim-injection operations involves interacting with one or more container deployment engines of the distributed computing environment, the one or more container deployment engines being configured to inject the respective shim into each respective container of the subset of containers.

7. The non-transitory computer-readable medium of claim 1, further comprising program code that is executable by the processor for causing the processor to:

automatically detect deployment of a new container in the distributed computing environment; and based on detecting the deployment of the new container in the distributed computing environment, automatically determine that the new container matches the predefined set of shim-injection criteria and responsively initiate a corresponding shim-injection operation for injecting a copy of the shim into the new container.

8. A method comprising:

analyzing, by one or more processors, each individual container of a plurality of containers executing in a distributed computing environment to determine whether the individual container has characteristics that match a predefined set of shim-injection criteria;

based on the analyzing, determining, by the one or more processors, that a subset of containers, among the plurality of containers executing in the distributed computing environment, each individually have the characteristics that match the predefined set of shim-injection criteria; and in response to determining that the subset of containers each individually have the characteristics that match the predefined set of shim-injection criteria, initiating, by the one or more processors, shim-injection operations that involve injecting a respective shim into a selected layer of each respective container of the subset of containers while the respective container is running in the distributed computing environment, such that the respective shim is executing inside an isolated environment of the respective container, wherein each respective shim is configured to intercept calls between a respective set of software programs located inside the respective container into which the respective shim is injected.

9. The method of claim 8, further comprising determining the predefined set of shim-injection criteria by extracting the predefined set of shim-injection criteria from a specification used to deploy controller software in the distributed computing environment.

10. The method of claim 8, further comprising updating a specification to indicate a status of the shim-injection operations associated with the subset of containers, wherein the status includes how many containers within the subset of containers have successfully received the shim, how many containers have failed to receive the shim, and how many containers are presently in a process of receiving the shim.

11. The method of claim 8, further comprising:

determining respective characteristics of each respective container in the subset of containers by extracting the respective characteristics of each respective container in the subset of containers from a respective specification used to deploy the respective container in the distributed computing environment.

12. The method of claim 8, further comprising:

for each respective container of the subset of containers, inserting the respective shim into the respective container of the subset of containers transparently to the respective set of software programs running inside the respective container.

13. The method of claim 8, wherein initiating the shim-injection operations involves interacting with one or more container deployment engines of the distributed computing environment, the one or more container deployment engines being configured to inject the respective shim into each respective container of the subset of containers.

14. The method of claim 8, further comprising:

automatically detecting deployment of a new container in the distributed computing environment; and based on detecting the deployment of the new container in the distributed computing environment, automatically determining that the new container matches the predefined set of shim-injection criteria and responsively initiating a corresponding shim-injection operation for injecting a copy of the shim into the new container.

15. A system comprising:

a processor; and a memory including instructions executable by the processor for causing the processor to perform operations including:

analyzing characteristics of a container executing in a distributed computing environment to determine whether the characteristics match a predefined set of shim-injection criteria;

based on the analyzing, determining that the characteristics of the container match the predefined set of shim-injection criteria; and in response to determining that the characteristics of the container match the predefined set of shim-injection criteria, initiating shim-injection operations that involve injecting a shim into a selected layer of the container while the container is running in the distributed computing environment, such that the shim is executing inside an isolated environment of the container, wherein the shim is configured to intercept calls between a set of software programs located inside the container into which the shim is injected.

16. The system of claim 15, further comprising instructions executable by the processor for causing the processor to:

determine the characteristics of the container by extracting the characteristics of the container from a specification used to deploy the container in the distributed computing environment.

17. The system of claim 15, further comprising instructions executable by the processor for causing the processor to:

insert the respective shim into the container transparently to the set of software programs running inside the container.

18. The system of claim 15, wherein the set of software programs are located inside different layers of the container.

19. The system of claim 15, wherein the selected layer is specified in a command associated with the shim-injection operations.

20. The system of claim 15, wherein the shim to be injected into the container is specified in a command associated with the shim-injection operations.

* * * * *